Oct. 25, 1955

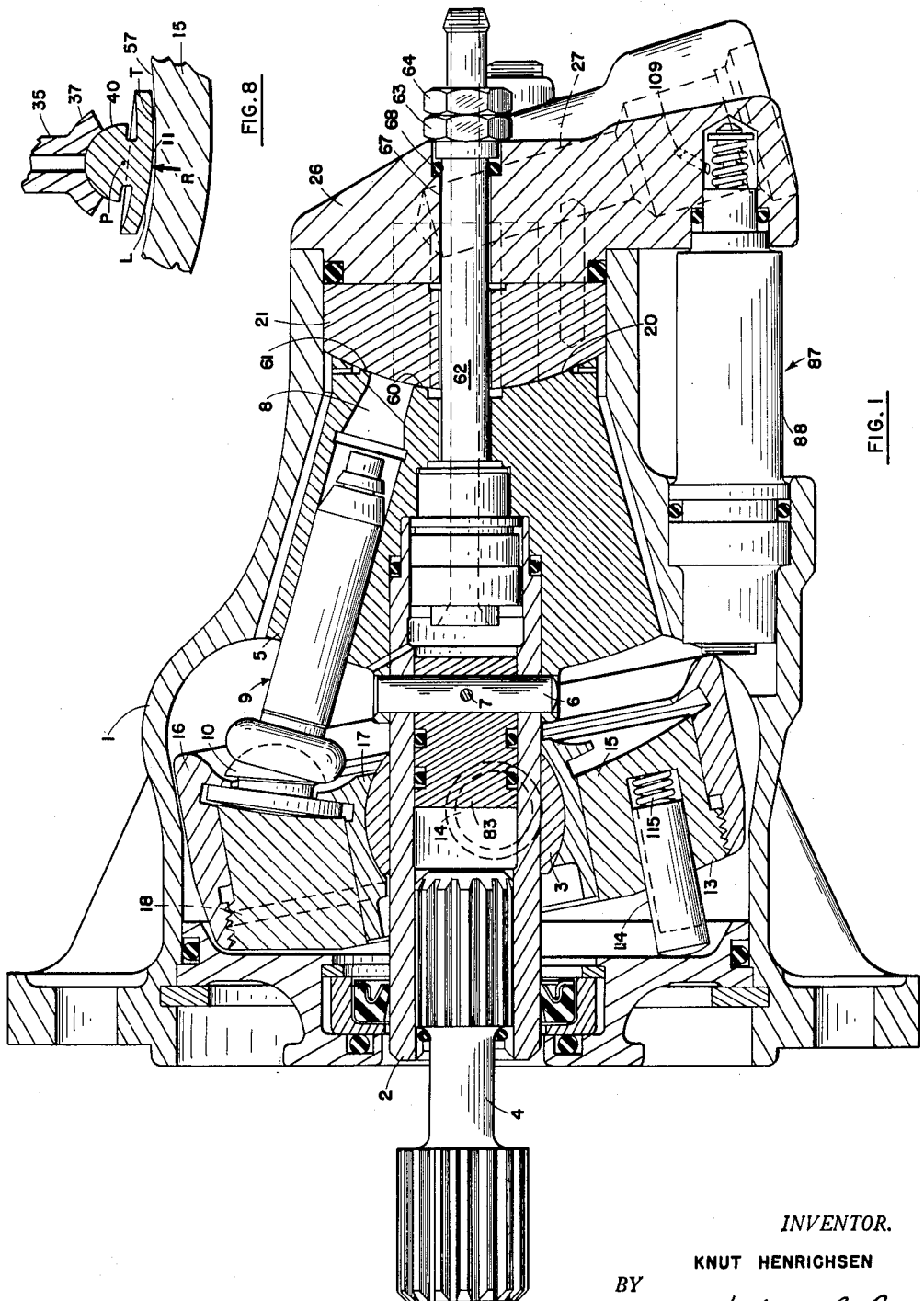

K. HENRICHSEN 2,721,519

FLUID ENERGY TRANSFER DEVICE

Filed July 17, 1951

*INVENTOR.*
KNUT HENRICHSEN

BY

William R. Lane

ATTORNEY

Oct. 25, 1955 K. HENRICHSEN 2,721,519
FLUID ENERGY TRANSFER DEVICE
Filed July 17, 1951 3 Sheets-Sheet 3

INVENTOR.
KNUT HENRICHSEN
BY
*William R. Lane*
ATTORNEY

United States Patent Office 2,721,519
Patented Oct. 25, 1955

2,721,519

FLUID ENERGY TRANSFER DEVICE

Knut Henrichsen, Los Angeles, Calif., assignor to North American Aviation, Inc.

Application July 17, 1951, Serial No. 237,173

13 Claims. (Cl. 103—162)

This invention relates to a fluid energy transfer device usable as a pump or motor, and more particularly to an improved pump or motor of high efficiency, light weight, and compact dimensions.

It is therefore an object of this invention to provide a unit of high capacity that is relatively small and light in weight.

Another object of this invention is to provide a pump or motor having friction- and wear-minimizing features.

A further object of this invention is to provide a pump or motor that will permit maximum port area with small leakage losses.

Still another object of this invention is to provide a pump or motor that has automatic lubricating means for bearing areas, and that will maintain a lubricating fluid film under all conditions.

An additional object of this invention is to provide a pump or motor having means responsive to cylinder pressure for providing extra lubrication for bearing surfaces.

Yet another object of this invention is to provide a pump or motor having means for maintaining a constant fluid film thickness between various bearing surfaces.

A further object of this invention is to provide a pump or motor of the swash plate type having means responsive to outlet pressure for varying the angle of the swash plate.

A still further object of this invention is to provide a pump that will exhaust air from within the pump housing so that a constant supply of oil will be provided for lubrication and cooling.

These and other objects of this invention will become apparent from the following description taken in connection with the accompanying drawings, in which:

Fig. 1 is a sectional view of this invention;

Fig. 8 is a diagrammatic view showing the operation of the unit of Fig. 7;

Figure 4:
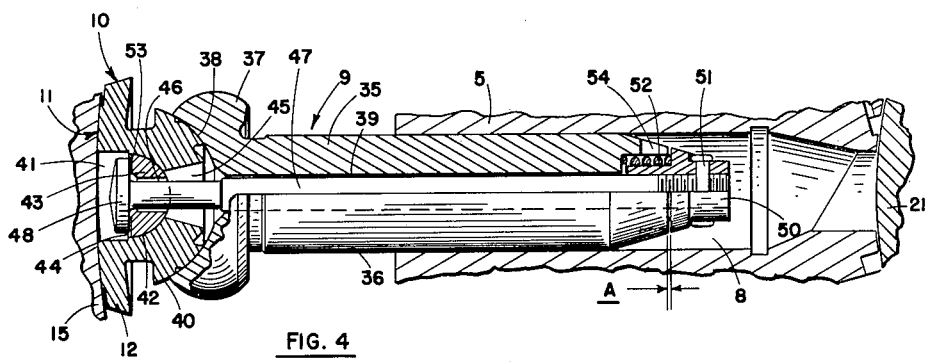
Fig. 4 is an elevation, partly in section, of a piston and slipper unit.

With reference to the drawings, the device comprises a housing 1 in which shaft 2 is rotatably mounted on a suitable bearing member 3. Shaft 2 is hollow and may be internally splined at one end for engagement with spline shaft 4 which will drive the unit when used as a pump, or may serve as the power takeoff when the unit is used as a motor. Mounted on shaft 2 is a cylinder block 5 which is secured to the shaft and rotatable therewith by means of pin 6 extending through block 5 and shaft 2 and held in place by rivet 7. Cylinder block 5 is provided with a plurality of cylinders or bores 8 arranged preferably in a conical manner. Piston means, denoted generally by the numeral 9, are reciprocal within the cylinders. Each piston means is provided with a slipper bearing member 10 pivotally engaging the outer end of the piston means. The slipper bearing members, constructed of bronze or other suitable bearing material, include bearing surface 11 and peripheral portions 12. A swash plate assembly 13 is pivotally secured within the housing on a pair of trunnions 14 and normally assumes an angle other than 90° relative to the axis cylinder block 5. The swash plate assembly includes a slipper race 15 having surface 57 which is engaged by bearing surfaces 11 of slipper bearing members 10. An outer retainer 16 is secured to the periphery of slipper race 15 in a suitable manner such as by screw threads, and an inner retainer 17 may be secured to the inner edge of the slipper race by pin 18. These retainers engage peripheral portions 12 of slipper bearing members 10 and serve to effect a positive return of the slipper and piston means when the unit is rotating at low speed. During high speed operation the conical arrangement of the cylinders will cause the piston means to return by centrifugal force alone.

Bearing member 3 has a curved outer portion which is engaged by the inner portion of retainer 17, which is slidable thereon when the angle of the swash plate is varied.

It may be seen that spline shaft 4, shaft 2, and cylinder block 5 will rotate together within the housing, thus causing a rotation of the cylinders 8 and the piston means 9 therein so that the swash plate 13 will cooperate with the slipper bearings 10 to impart a reciprocal motion to the piston means. When the unit is used as a motor the driving force will come from the piston means and will rotate spline shaft 4 while use of the unit as a pump will require a source of power (not shown) connected with spline shaft 4 for rotating cylinder block 5 and causing reciprocation of the pistons.

The end 20 of cylinder block 5, away from swash plate 13, is in bearing relationship with stationary valve block or plate 21. Surface 20 of cylinder block 5, and surface 22 of valve block 21, have complementary spherical curved surfaces, which will permit use of a freely floating cylinder block mounted on the single bearing member 3.

Figure 3:
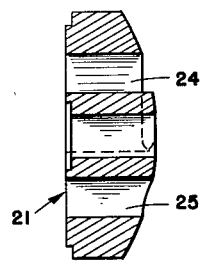
Fig. 3 is a sectional view along the line 3—3 of Fig. 2.
Figure 2:
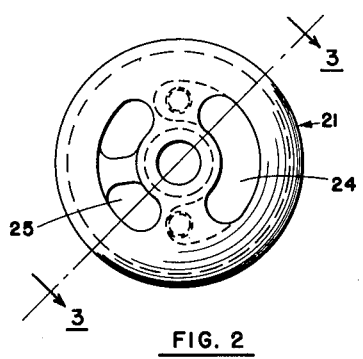
Fig. 2 is an elevation of the valve plate comprising a part of this invention.

Referring now to Figs. 2 and 3, it may be seen that valve block 21 includes inlet ports 24 and outlet ports 25 extending therethrough. Port block 26 includes an inlet (not shown) and outlet 27 in communication with ports 24 and 25 respectively. Thus fluid may enter the inlet in port block 26, flow through inlet port 24 of valve block 21, and from there into a cylinder 8 when the piston means is on the inlet stroke away from the valve block. Similarly, fluid may exhaust from the cylinder on the return stroke of the piston means through port 25 and outlet 27.

To prevent wear and lessen friction losses, it is necessary to lubricate bearing surface 11 of slipper member 10 in engagement with swash plate 13. This may be accomplished by the embodiment of this invention illustrated in Fig. 4, which is particularly useful for relatively slow speed operation or for occasions when the unit must start under loaded conditions as when used as a motor. Piston means 9 consists of an elongated member 35 having cylindrical outer surface 36 adapted to slidably reciprocate within a cylinder 8, and a head portion 37 which at all times remains outside the cylinder bore. Head portion 37 has a rounded concave end surface 38. Extending axially through the center of member 35 is a cylindrical bore 39. Slipper bearing 10 includes a ball-shaped portion 40 opposite from bearing surface 11 which is complementary to concave surface 38 of head portion 37 which it pivotally engages. Bearing surface 11 of the slipper also includes a central recess 41 therein which recess includes substantially spherical surface 42. Half-ball or abutment 43 is complementary to surface 42 and receivable thereon in pivotal engagement. Half-ball 43 also presents a flat outer surface 44. The slipper and the half-ball have central apertures 45 and 46, respectively, therethrough.

Extending through the apertures in slipper 10 and half-ball 43, and through bore 39 in elongated member 35, is a rod 47. One end of this rod has an enlarged head portion 48 adapted to abuttingly engage flat surface 44 of half-ball 43. Received on the opposite end of rod 47, adjacent the end of elongated member 35 within the cylinder, is a cap member 50 which may be secured by screw threads and held against rotation by pin 51. Disposed between member 35 and the cap is a helical compression spring 52, the force of which keeps head 48 of rod 47 normally in engagement with surface 44 of half-ball 42, with the cap spaced from member 35 by distance A. The diameter of rod 47 is less than that of bore 39 in member 35 for allowing fluid to flow from cylinder 8 through the bore around the rod and through apertures 45 and 46 in the slipper and half-ball respectively. Surface 44 of half-ball 43 is provided with grooves 53 or other similar openings which will allow the fluid to flow into recess 41 in slipper surface 11. By a proper selection of the diameters of the rod 47 and bore 39 in member 35 the rate of fluid flow from the cylinder to recess 41 can be controlled and a predetermined quantity of fluid allowed to flow through the piston means into recess 41. The rod and the bore thus cooperate to meter the fluid flow from the cylinder into the recess.

In operation of the device the fluid will flow outwardly from recess 41 across bearing surface 11 of slipper bearing 10 so as to provide a lubricating film between the slipper and surface 57 of the swash plate. A portion of this fluid will also lubricate between ball portion 40 of the slipper and surface 38 of member 35, and between mating surfaces of the half-ball and slipper.

When, upon rotation of the cylinder block, a piston means enters the pressure stroke, a load is suddenly applied, forcing the slipper and slipper race against each other. This suddenly applied load tends to squeeze the oil film from between bearing surface 11 of the slipper and surface 57 of the swash plate slipper race. The restricted passage through bore 39 into recess 41 will not transmit high-pressure fluid from the cylinder to the recess quickly enough to compensate for the sudden load so as to maintain a fluid film between the slipper and the slipper race. However, by the provisions of this invention the force thus applied within the cylinder will act upon cap 50 so as to compress spring 52 and shift the rod axially relative to member 35 and to slipper 10 through the distance A toward the slipper race. This causes more of the volume of rod 47 to enter recess 41 which will thus apply a compressive force to the fluid within the recess. Some of the fluid within recess 41 will be forced outwardly across surface 11 as a result of this compressive force, thus maintaining a fluid film between the slipper and the swash plate and preventing metal-to-metal contact.

The force within the cylinder during the pressure stroke will maintain the cap in its abutting relationship with the end of member 35, and when the load is taken off the cap at the conclusion of the pressure stroke the spring will return the cap to its normal position spaced from member 35 by distance A. In order to allow a constant flow of fluid through bore 39 and slipper 10 during the compression stroke, the end of member 35 is provided with slots 54 communicating with bore 39. Fluid flowing through these slots into the bore and into recess 41 will maintain the fluid film between the slipper bearing and the slipper race during the pressure stroke of the piston means after rod 47 has applied its force to the fluid in the recess.

Figure 5:
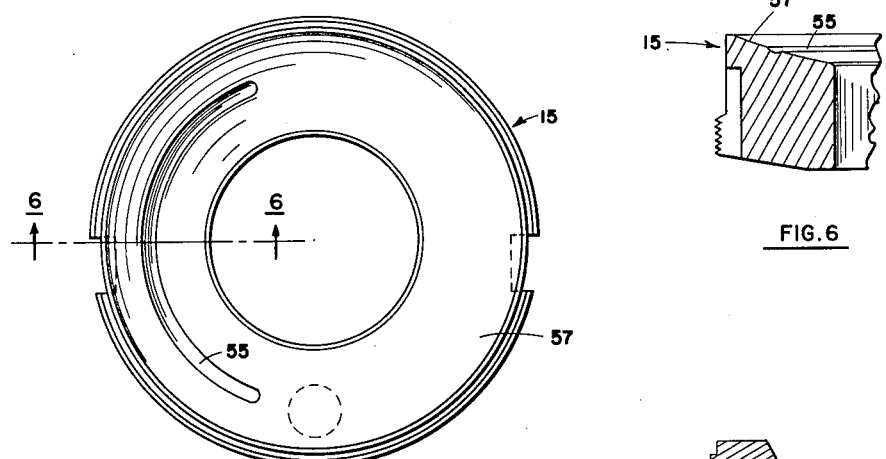
Fig. 5 is an elevation of the slipper race comprising a part of this invention.
Figure 6:
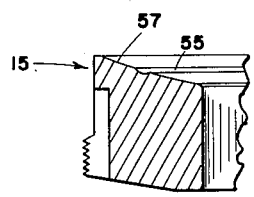
Fig. 6 is a sectional view along line 6—6 of Fig. 5.

When rod 47 is shifted axially at the conclusion of the pressure stroke by the action of spring 52, and thus partially withdrawn from recess 41, it will tend to create a vacuum within the recess. To prevent cavitation within this recess and maintain a constant supply of lubricating fluid, slipper race 15 is provided with a groove 55 extending arcuately part way around surface 57 as illustrated in Figs. 5 and 6. Groove 55 may be shallow, as shown in Fig. 6, and lies in the path of the slippers. This groove will retain lubricating fluid from within the housing (which is present because of leakage around the cylinder block and piston means, or which may be introduced into the housing from other sources if desired). When rod 47 is shifted away from the swash plate by the spring, oil will be drawn from groove 55 into recess 41, thus maintaining a constant supply and eliminating cavitation.

Figure 7:
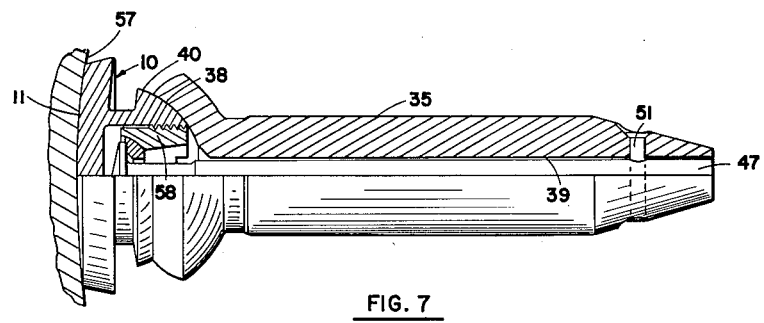
Fig. 7 is an elevation, partly in section, of a modified form of piston and slipper unit.

Another embodiment of the piston means is illustrated in Fig. 7. In this construction, rod 47 is pinned directly to elongated member 35 and is not movable axially relative thereto. In this embodiment the flow of fluid between the rod and bore 39 of member 35 is merely for providing lubrication between portion 40 of the slipper and end 38 of member 35, and between mating surfaces of the half-ball and the slipper. Bearing surface 11 is constant throughout its area and is not provided with a recess as in the previously mentioned embodiment. It should be noted that surface 57 of slipper race 15 presents a concave spherical surface towards the slipper member, and that bearing surface 11 of the slipper is also curved in a convex manner complementary thereto. The slipper bearing surface is symmetrical around the central axis of member 35 and pivotal relative thereto along spherical surfaces of portions 38 and 40. To permit assembly of the unit, slipper member 10 is constructed in two parts having section 58 threadably received by the main portion of the slipper for engaging half-ball 43.

Referring now to Figure 8, in operation of the unit, heat will be generated by the movement of the slipper relative to the slipper race (to the left in the drawing), raising the temperature of surfaces 11 and 57. Heat will flow away from these surfaces to the cooler portions of the slipper race and of the slipper which are not in engagement with each other. The resulting temperature gradients will cause uneven expansion of the slipper bearing and of the slipper race, causing surface 11 to increase its convexity and surface 57 to decrease its concavity. A portion of the fluid within the housing will be present on the slipper race and will form a lubricating film between the slipper and the slipper race. By reason of the differences in curvature due to the increased temperature of the slipper and the slipper race, the film thickness near the periphery of the slipper will be greater than near the center. As the slipper moves relative to the slipper race, pressure will build up beneath the leading surface of the slipper (the surface in front as the slipper moves) from the leading edge of the slipper to the point where the slipper is nearest the slipper race, this being the point of tangency between bearing surface 11 of the slipper and a surface parallel to surface 57 of the slipper race. In back of this point on the slipper the pressure decreases sharply, theoretically reaching a negative value. As shown in Fig. 8 this pressure beneath leading surface L causes the slipper to pivot or cock slightly relative to the piston means and the slipper race, thus elevating the leading surface. The slipper will pivot until point T, where it is nearest the slipper race, has shifted well behind point P, where the slipper pivots relative to the piston means (point P being the center of curvature of ball portion 40 of the slipper). The slipper will reach a position where the resultant R of the pressure beneath the leading surface will pass through the pivot point P, thereby precluding any further pivoting of the slipper and allowing stable operation on the position illustrated with the leading surface elevated. This permits maintenance of a fluid film between the slipper and the slipper race as the slipper rotates and loads are applied. This type of slipper has the advantage of extremely simple symmetrical design while providing a unit reversible in operation. There is of course no groove in the slipper race when a slipper of this configuration is used.

End 20 of cylinder block 5 is disposed adjacent to stationary valve block 21 as mentioned above. Lubrication of the adjacent surfaces of the cylinder block and the valve block is accomplished by means of the leakage fluid flowing from the cylinders across dam portions 60 and 61 of this end of the cylinder block. This leakage of course obtains principally on the pressure stroke of the piston means.

When the cylinder block rotates the piston forces urge the cylinder block against the valve block in opposition to the fluid forces across dam portions 60 and 61 which are pushing the cylinder block away from the valve block. In an underbalanced valve, the valve ports are of relatively small area which results in a fluid force on the dams of relatively small magnitude in opposition to the piston forces. This allows only minor quantities of pressure fluid to leak out of cylinders, but provides a very thin fluid film between the cylinder block and the valve block which causes high frictional resistance and which may result in metal-to-metal contact and severe wear. In an overbalanced valve relatively large port areas will result in a greater force separating the cylinder block and the valve block in opposition to the piston forces within the cylinders. In such a valve the fluid film thickness will be relatively great, friction will be minimized, but leakage losses may become excessive. In this improved pump a slightly overbalanced valve may be used with corresponding advantages of low friction and increased port areas, while at the same time controlling the film thickness and minimizing leakage losses.

To accomplish this a hollow rod or axle 62 may be secured relative to the housing such as by anchoring it to the port block by means of threaded nuts 63 and 64. This axle projects inwardly through apertures 67 in the port block, valve block, and cylinder block. Suitable sealing means such as O ring 68 may be utilized in the port block to prevent access from the exterior of the housing to these apertures. It should be noted that axle 62 and the apertures have the same axis as shaft 2, this being the central axis of the rotating parts. The inner end of the axle projects into the hollow center of shaft 2, the aperture 67 in the cylinder block being enlarged at this portion so as to receive the shaft. A suitable sealing arrangement such as O ring 69 is provided between shaft 2 and the cylinder block.

The inner end of axle 62 is provided with enlarged portion 70 abuttingly engaged by half-ball 71 which is received on the shaft. A seal between the half-ball 71 and axle 62 is provided by suitable means such as O ring 72. Also received on the shaft and abutting the outer surface of the half-ball is balance piston 73. Near one end balance piston 73 is cut away so as to receive compression spring 75, the other end of which contacts bearing member 76 which may be made of steel and is loosely received within aperture 67. This bearing member in turn engages bronze bearing member 77 which bears against a complementary surface in the cylinder block and is thereby prevented from axial movement. Thus the balance piston is held in place by half-ball 71 and spring 75, this spring also exerting a force through the bearings urging the cylinder block into contact with the valve block. Bearing member 77 will rotate with the cylinder block while bearing member 76, the balance piston, and the half-ball will remain stationary with the axle.

Figure 9:
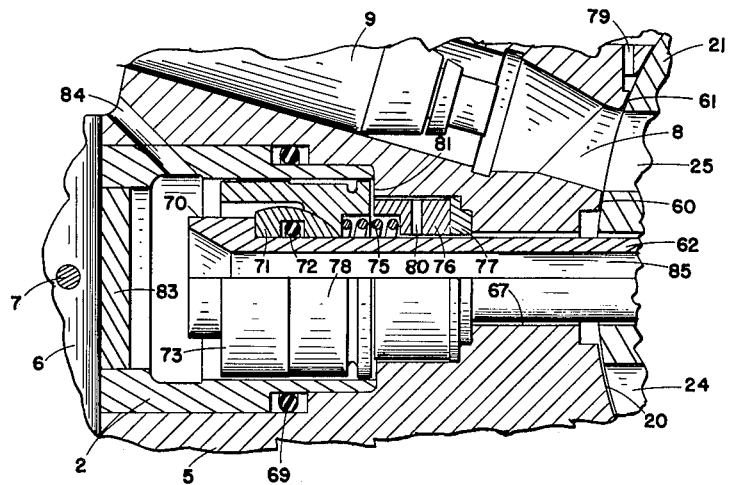
Fig. 9 is an elevation, partly in section, of the balance piston and related parts.

With particular reference to Fig. 9, the operation of the pump is such that fluid from a cylinder bore 8, which opens into high-pressure exhaust port 25 in the valve block in the position illustrated, will leak outwardly between the cylinder block and the valve block across dam portion 61 and through aperture 79 in the cylinder block to the interior of the housing. An additional amount of fluid from the cylinder bore will leak across dam portion 60 into the central aperture 67 in the cylinder block. These quantities of leakage fluid will exert a force on the adjacent faces of the cylinder block and valve block, tending to force them apart, this force, when the pump attains normal operating speed, being greater than the force exerted by spring 75. The leakage fluid which has flowed into apertures 67 will travel through the aperture along the outside of the axle and may flow through openings 80 in bearing member 76 and thence into the end of shaft 2 occupied by the balance piston 73. This fluid will be confined in this area by the balance piston and will therefore bear against shoulder 81 of the cylinder block and against bearing 76, and thereby urge the cylinder block into contact with the valve block in opposition to the forces across the dams tending to force them apart. Balance piston 73 is made to a diameter slightly under the internal diameter of the end of shaft 2 and will therefore permit the flow of a certain amount of fluid into the shaft past the piston which in this manner operates to meter the flow of leakage fluid. Balance piston 73 is preferably of a stepped construction, having portion 78 of lesser diameter intermediate the ends of the piston. This narrower portion will permit the leakage fluid to center the piston with respect to aperture 67, thus enabling the piston to always assume the same position within the aperture and accurately meter the flow. The balance piston is of course stationary at all times, serving only to meter and confine the fluid.

The areas of shoulder 81 and bearing 76 in relation to the areas of dams 60 and 61 are so selected that if the gap between the cylinder block and the valve block should increase beyond the normal value, thus increasing the flow into the central aperture 67, a greater force will be exerted against shoulder 81 and bearing 76 than on dams 60 and 61 which will thus urge the cylinder block back towards the valve block. As a result the gap between the cylinder block and the valve block will decrease. Similarly, if the gap should decrease between the cylinder block and the valve block, the flow into the aperture, and therefore the pressure within the aperture against shoulder 81 and bearing 76, will also decrease, allowing the pressure on the dam portions to force the cylinder block away from the valve block and open up the gap.

By a proper selection of dam areas, shoulder areas, and the area around the balance piston for metering the flow, the pump may be constructed so as to provide a predetermined optimum film thickness between the valve block and the cylinder block. These areas should be so selected that at the desired film thickness the pressure within aperture 67 is approximately one-fourth the value of the pressure existing in the high-pressure port 25. This is because the pressure within aperture 67 can never be lower than the housing pressure, nor can it be higher than approximately half of the value in the high-pressure port. To obtain a pressure in aperture 67 of half of the pressure in the high-pressure port would require a gap between the cylinder block and the valve block of infinite size to allow the flow into aperture 67 to equal the flow out of the aperture. As such a fluid flow the proportion of fluid flowing past balance piston 73 would be negligible and practically all of the fluid would pass out of aperture 67 into low-pressure port 24. However, at finite dimensions of the gap between the cylinder block and the valve block it is possible to obtain a pressure in aperture 67 that approaches but not quite equals half of the pressure in the high-pressure port. On the other hand, if the aperture pressure were the same as the housing pressure, there would be no gap between the valve block and the cylinder block and consequently no fluid flow. The limits of operation are therefore pressures near the housing pressure and one-half of the pressure in the high-pressure port, from which it follows that a value of around one-fourth of the pressure in port 25 should be selected as the aperture pressure so that there will be an equal amount of force available for shifting the cylinder block either toward or away from the valve block as the occasion may require.

The interior of shaft 2 beyond balance piston 73 is provided with a plug 83 which will prevent fluid from traveling further through the shaft. This interior portion of the shaft has access to the interior of the housing by any suitable means, such as apertures 84 through the shaft and the cylinder block. Axle 62 is hollow, having bore 85 extending longitudinally therethrough. This bore is connected outside the housing to any desired return line (not shown). When the pump is operated the casing will not only contain fluid for lubricating the moving parts, but will also contain a quantity of air which the lubricant has not displaced. The air is of course detrimental to the operation of the pump because it will not provide lubrication or proper cooling for the parts. By providing a central outlet through the hollow axle, this device will quickly and efficiently exhaust the air from the interior of the housing. This will result because the rotation of the parts and the fluid within the housing will provide a centrifuge effect which will force the air, being the lighter fluid, to the center of the housing and out through the hollow axle. This pump thereby reduces wear of the parts and is cool in its operation.

It is desirable to vary the angle of swash plate 13, and therefore the displacement of the pump, in relation to the pump outlet pressure. This is accomplished by a governor unit denoted generally by the numeral 87 and illustrated in Fig. 10. This unit comprises a cylinder 88 carried by the lower portion of the housing, and a piston 89 reciprocable therein. A plug 90 may be threadably received by one end of the piston and abuttingly engage a portion of the swash plate at a point remote from the pivotal connection of a swash plate to the housing. Movement of the piston within the cylinder, and thus of the plug, will pivot the swash plate relative to the housing, thereby changing its angle and altering the displacement of the pump.

The threaded plug may include slotted portions near one end through which a pin 91 may be inserted which also passes through openings in the piston and serves to anchor the threaded plug in position against rotation. The plug 90 thus serves as an adjustable connection between the piston and the swash plate for setting the initial angle of the swash plate which setting may be retained by means of pin 91.

Figure 10:
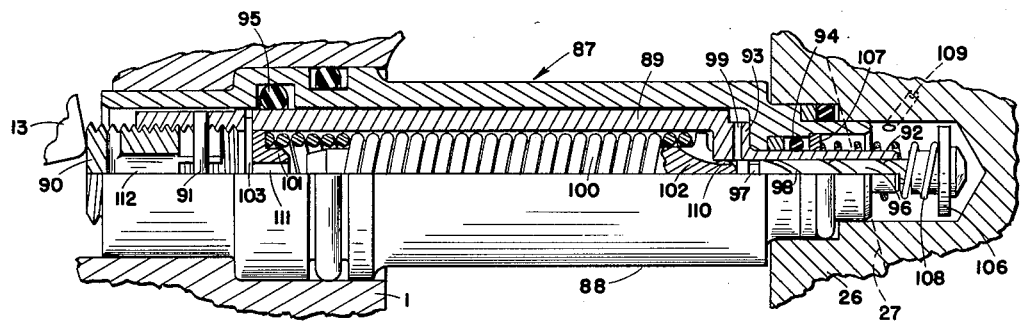
Fig. 10 is an elevation, partly in section, of the governor unit.

Piston 89 includes a narrow projecting portion 92 on the end opposite from the plug which portion extends outwardly through the end wall of the cylinder and provides a shoulder or head portion 93 for the piston. A sealing means such as O ring 94 is disposed between the cylinder and the periphery of this end portion of the piston. Also within the cylinder an O ring 95 seals the periphery of the piston from the cylinder, thus sealing the interior of the cylinder from the housing. Received within narrow end portion 92 of the piston is a slide valve member 96, including fluid distributing portion 97 and an inlet such as spiral groove 98. Apertures 99 interconnect the interior of the cylinder with the interior of the piston. Received within the larger portion of the piston is a helical spring 100 which is disposed between abutment member 101 and guide member 102. Abutment member 101 is prevented from movement in the piston by suitable means such as a pin 103 while guide member 102 normally bears against the interior of shoulder portion 93. Helical spring 100 is preferably precompressed before inserting into the piston for reasons hereinafter made more clear. Guide member 102 bears against the inner end of valve member 96 with the force exerted by spring 100. The valve as illustrated in Fig. 10 is in a closed position where fluid distributing portion 97 has no access to apertures 99 in the piston and thus to the interior of the cylinder. It can be seen that spring 100 acting through guide member 102 urges the valve to this closed position and will resist forces tending to open the valve.

The opposite end of the valve member outside of the cylinder is provided with a cap portion 106. Disposed between this cap portion and washer 107, which bears against a shoulder on the cylinder, is a second helical spring 108. A source of high-pressure fluid, preferably connected with the pump outlet, is provided for the valve inlet by some means such as opening 109 in the port block connected with pump outlet 25.

The high-pressure fluid from opening 109 will bear against valve member 96 with a resultant force urging it axially toward an open position. When this pressure produces a force on the valve member sufficient to overcome the opposing force exerted by helical spring 100 arising from its precompression, this spring will compress further allowing the valve member to shift axially relative to the piston to an open position so that fluid distribution portion 97 is in communication with apertures 99 leading to the interior of the cylinder. High-pressure fluid will then enter through these apertures bearing against end 93 of the piston and exerting a force thereon for axially displacing the piston relative to the cylinder toward the swash plate. When the axial displacement of the piston takes place, spring 108 compresses, thereby exerting an additional force on the valve urging it to a closed position, which force will increase proportionally with the displacement of the piston.

The movement of the piston relative to the cylinder is transmitted to the swash plate by means of plug 90, thereby causing the swash plate to assume an angle closer to 90° relative to the axis of the cylinder block. This action reduces the stroke of piston means 9 in cylinders 8 thus decreasing the displacement of the pump.

When the forces of spring 100 and spring 108 on valve member 96 are sufficient to overcome the force from the high-pressure fluid the valve member will shift back to a closed position. The high-pressure fluid then has access to the interior of the housing by means of apertures 99 in the piston, grooves 110 in guide member 102, opening 111 in abutment member 101, and openings 112 in plug 90. The fluid is therefore no longer exerting a force against end 93 of the piston which may then shift in the opposite direction away from the swash plate until the fluid force again overcomes the spring forces or to the position illustrated in Fig. 10. As the piston returns, the excess fluid in the cylinder will flow out of the cylinder to the center of the piston and into the interior of the housing through these apertures. Thus by the proper selection of spring tensions and piston area this governor unit will accurately control the displacement of the pump at any desired pressure.

Modifications of this governor unit include its use with only one spring. It is possible to utilize only spring 100 within the piston, in which case there would be no additional force proportionate to displacement of piston 89 relative to the cylinder urging the valve closed. Spring 100 could also be eliminated and a governor constructed with the one spring 108. This latter case would require spring 108 to be much stronger than when used in conjunction with a second spring as illustrated in Fig. 10.

If desired, on the back side of the swash plate there may be provided a sleeve or cylinder 114 having a spring 115 disposed inside and contacting the swash plate, the outer end of the sleeve abutting the end of the housing. This spring will work in opposition to the governor and assure that the swash plate is always in contacting relationship with the governor. Spring 115 is aided in its action by the force of the pistons as exerted against the swash plate slipper race. Trunnions 14 are located below the swash plate centerline, as clearly shown in Fig. 1, enabling the forces exerted by the piston through the slippers to urge the swash plate to a more acute angle relative to the axis of cylinder block 5, opposing the action of the governor.

The above detailed description of this invention should be clearly understood as by way of illustration and example only and is not to be taken by way of limitation, the spirit and scope of this invention being limited only by the terms of the appended claims.

I claim:

1. A pump comprising a housing; a fixed valve plate having fluid distributing ports therein; a cylinder block rotatably mounted in said housing in bearing relationship with said valve plate, said block having cylinder bores therein; a swash plate carried by said housing; piston means slidably received within said bores; a bearing member pivotally mounted on the end of each of said piston means remote from said valve plate and adapted to abuttingly engage said swash plate, each bearing member being provided with a recess in the surface thereof in engagement with said swash plate; means for introducing into said recesses a predetermined quantity of lubricating fluid; and means associated with said piston responsive to pressure in said bores for applying a compressive force to the fluid in said recesses.

2. A device as recited in claim 1 in which said piston means and said bearing members are provided with alignable, axially disposed apertures therethrough, and in which said means for applying a compressive force to the fluid in said recessed portions comprises reciprocable members received within said apertures and responsive to pressure within said bores for shifting axially relative to said piston means and bearing members, toward said swash plate, thereby exerting a compressive force against said fluid.

3. A device as recited in claim 1 in which said piston means and said bearing members are provided with alignable axially disposed apertures therethrough, and in which said means for applying a compressive force to the fluid in said recessed portions comprises reciprocable members received within said apertures and responsive to pressure within said bore for shifting axially relative to said piston means and bearing members, toward said swash plate, thereby exerting a compressive force against said fluid, and resilient means operative on said reciprocable members in opposition to the pressure in said bores for shifting said members in the opposite direction when said pressure reaches a predetermined value.

4. A device as recited in claim 1 in which said piston means and said bearing members are provided with alignable axially disposed apertures therethrough, and in which said means for applying a compressive force to the fluid in said recessed portions comprises reciprocable members received within said apertures and responsive to pressure within said bores for shifting axially relative to said piston means and bearing members toward said swash plate, thereby exerting a compressive force against said fluid, and resilient means operative on said reciprocable members in opposition to the pressure in said bores for shifting said reciprocable members in the opposite direction when said pressure reaches a predetermined value, and in which said swash plate is provided with groove means in the face thereof for supplying an additional quantity of fluid to said recessed portions when said reciprocable members shift in response to said resilient means.

5. A pump comprising a housing; a fixed valve plate having fluid distributing ports therein; a cylinder block mounted in said housing in bearing relationship with said valve plate, said block having cylinder bores therein; a swash plate carried by said housing; piston means slidably received within said bores; a bearing member pivotally mounted on the end of each of said piston means remote from said valve plate and adapted to engage said swash plate, each bearing member being provided with a recess in the surface thereof engaging said swash plate, each of said piston means and said bearing members being provided with an aperture therethrough; a rod received within each of said apertures; a cap member secured to and carried by each of said rods adjacent that end of said piston means remote from said bearing members, said cap member being normally in spaced relationship with said end of said piston means and responsive to fluid pressure within said bore for moving to a position in abutting relationship with said end of said piston means for axially shifting said rod so as to exert a compressive force on the fluid in said recessed portion; and resilient means for urging said cap in the opposite direction back to said normal position.

6. A device as recited in claim 5 in which said rod is provided with means at one end for engaging the recessed portion of said bearing member to limit the travel of said rod away from said swash plate and cooperating with said resilient means for holding said cap in normal position.

7. A pump having a housing; a fixed valve plate having fluid distributing ports therein; a cylinder block rotatably mounted within said housing adjacent said valve plate, said cylinder block having cylindrical bores therethrough; a swash plate carried by said housing; and piston means reciprocable within said bores, each of said piston means comprising an elongated member complementary to a cylinder bore, one end of said elongated member being concave in contour; a bearing member having a convex surface complementary to said concave end of said elongated member and pivotally receivable thereon, the opposite side of said bearing member presenting a bearing surface for engagement with the face of said swash plate and having a recessed portion in the central portion thereof; an abutment member pivotally received within said recessed portion, said abutment member, bearing member, and elongated member being provided with alignable central apertures therethrough providing open communication between said recessed portion and the end of said elongated member remote from said bearing member; a rod extending through said apertures, one end of said rod being provided with an enlarged portion adapted to engage said abutment member for preventing movement of said rod in one direction, the aperture in said elongated member being of greater diameter than the diameter of said rod for permitting flow of a predetermined quantity of fluid through said aperture into said recessed portion; a cap member secured to and carried by the end of said rod remote from said bearing member; a spring disposed between said cap member and said elongated member operative in opposition to forces within said cylinder and compressible so as to allow movement of said rod relative to said bearing member for applying a compressive force on the fluid within said recessed portion, said swash plate being provided with groove means for supplying fluid to said recessed portion on return of said rod following compression of said spring.

8. A pump comprising a housing; a fixed valve plate having fluid distributing ports therein; a cylinder block rotatably mounted within said housing in bearing relationship with said valve plate, said cylinder block being provided with a plurality of cylinders; piston means reciprocable within said cylinders; a plurality of symmetrical slipper bearings, one side of each of which includes a ball-shaped portion centrally disposed thereof, one end of each of said piston means having a socket portion therein complementary to said ball-shaped portion; means for holding said side of said slipper bearing in pivotal engagement with said end of said piston means; a swash plate having a concave spherical surface carried by said housing, the side of said slipper bearings remote from said piston means including a convex surface complementary to and adapted to abuttingly engage said surface of said swash plate, whereby movement of said slipper bearings relative to said swash plate generates heat causing said slipper bearings to increase their convexity and said swash plate to decrease its concavity and fluid on said swash plate builds up a pressure beneath the leading surface of each of said slipper bearings and said slipper bearings are operable upon rotation of said cylinder block in either direction relative to said swash plate for pivoting relative to said piston means so that the leading portion of each of said slipper bearing surfaces is elevated from said swash plate for permitting lubrication of said abutting surfaces of said swash plate and said slipper bearing.

9. A pump comprising a housing; a valve plate having fluid distributing ports therein; a cylinder block rotatably mounted in said housing in bearing relationship with said valve plate, said cylinder block being provided with a plurality of cylinder bores extending therethrough; piston means reciprocably received within said bores; a swash plate mounted within said housing; and means for adjusting the angle of said swash plate relative to said housing, said means comprising a cylindrical member carried by said housing, a piston member reciprocable within said cylinder, one end of said piston abutting said swash plate, the opposite end of said piston being provided with valve means; a source of pressurized fluid connected with the inlet side of said valve means, said fluid being operative to urge said valve means to an open position, the outlet side of said valve means being connected with the interior of said cylinder; resilient means disposed within said piston abutting said valve means and operative for urging said valve means to a normally closed position, said pressurized fluid being operative to open said valve means at a predetermined pressure for permitting entrance of fluid into said cylinder to axially displace said piston relative to said cylindrical member for varying the angle of said swash plate relative to said housing; and a second resilient means operative upon said valve means when said piston is displaced relative to said cylinder for urging said valve means to a closed position.

10. A pump comprising a housing; a valve plate having fluid distributing ports therein; a cylinder block rotatably mounted in said housing in bearing relationship with said valve plate, said cylinder block being provided with a plurality of cylinder bores extending therethrough; piston means reciprocably received within said cylinders; a swash plate carried by said housing; and means for adjusting the angle of said swash plate relative to said housing, said means comprising a cylindrical member which is carried by said housing and which is provided with an end wall; a tubular piston member reciprocable therein with its periphery in close association with the interior of said cylinder, one end of said piston adapted to abuttingly engage said swash plate, the opposite end portion of said piston including an elongated projection which defines a shoulder on said end portion, extends through said end wall of the cylinder, and which is provided with apertures in communication with the interior of said cylinder; a source of high-pressure fluid connected with said end portion; valve means disposed within said end portion; said fluid being operative for urging said valve means to an open position for permitting passage of fluid through said apertures into said cylinder to exert a force on said shoulder for axially displacing said piston relative to said cylinder, thereby to adjust the angle of said swash plate relative to said cylinder block; resilient means received within said piston operative on said valve means in opposition to said high-pressure fluid for urging said valve means to a closed position; and a second resilient means operative on said valve means when said piston is displaced relative to said cylinder for urging said valve means to a closed position.

11. A pump comprising a housing; a valve plate having fluid distributing ports therein; a cylinder block rotatably mounted in said housing in bearing relationship with said valve plate, said cylinder block being provided with a plurality of cylinder bores extending therethrough; piston means reciprocably received within said bores; a swash plate mounted within said housing; and means for adjusting the angle of said swash plate relative to said cylinder block, said means comprising a cylindrical member provided with an end wall and which is carried by said housing; a tubular piston member reciprocable therein with its periphery in close association with the interior of said cylinder, one end of said piston adapted to abuttingly engage said swash plate, the opposite end portion of said piston including an elongated projection which defines a shoulder on said end portion, extends through said end wall of the cylinder, and which is provided with apertures in communication with the interior of said cylinder; a source of pressurized fluid connected with said end portion; valve means disposed within said end portion; said fluid being operative for urging said valve means to an open position for permitting passage of fluid through said aperture into said cylinder to exert a force on said shoulder for axially displacing said piston relative to said cylinder, thereby to adjust the angle of said swash plate relative to said cylinder block; a precompressed spring received within said piston operative on said valve means in opposition to said fluid for urging said valve means to a closed position; a second spring operative on said valve means upon displacement of said piston relative to said cylinder for exerting a force proportionate to said displacement for urging said valve means to a closed position; and means for exhausting fluid from said cylinder through said piston when said valve means is in a closed position.

12. In a fluid energy transmitting device, a housing; a fixed valve plate having fluid distributing ports therein; a cylinder block rotatably mounted in said housing in bearing engagement with said valve plate, said cylinder block being provided with a plurality of cylinder bores; piston means reciprocal within said cylinder bores; resilient means urging said block into contacting relationship with said valve plate; means engageable by said piston means for imparting reciprocal movement thereto upon rotation of said block whereby fluid in said cylinder bores is pressurized by said pistons and pumped through said ports, and a portion of such fluid leaks between adjacent surfaces of said block and said valve plate, said leakage fluid thereby exerting a force on said surfaces operative to urge said block away from said valve plate, said cylinder block having a centrally disposed aperture extending therethrough adapted to receive a portion of said pressurized fluid which leaks from said cylinders; a surface within said aperture operable upon by said leakage fluid for exerting a force in the opposite direction for urging said block toward said valve plate; and a piston within said aperture, said aperture being of greater diameter than the diameter of said piston for thereby controlling the quantity of flow of leakage fluid through said aperture around said piston.

13. A device as described in claim 12 in which said piston is carried on a rod secured to said housing and projecting into said aperture, said rod having an opening therethrough in open communication with the exterior of said housing for providing a centrally disposed outlet for said housing.

References Cited in the file of this patent

UNITED STATES PATENTS

| | | |
|---|---|---|
| 1,710,567 | Carey | Apr. 23, 1929 |
| 1,930,163 | Ferris | Oct. 10, 1933 |
| 2,000,271 | Benedek | May 7, 1935 |
| 2,164,171 | Benedek | June 27, 1939 |
| 2,284,109 | Vickers | May 26, 1942 |
| 2,284,169 | Robinson | May 26, 1942 |
| 2,299,234 | Snader | Oct. 20, 1942 |
| 2,299,235 | Snader et al. | Oct. 20, 1942 |
| 2,508,309 | Tweedale | May 16, 1950 |